Patented Feb. 26, 1929.

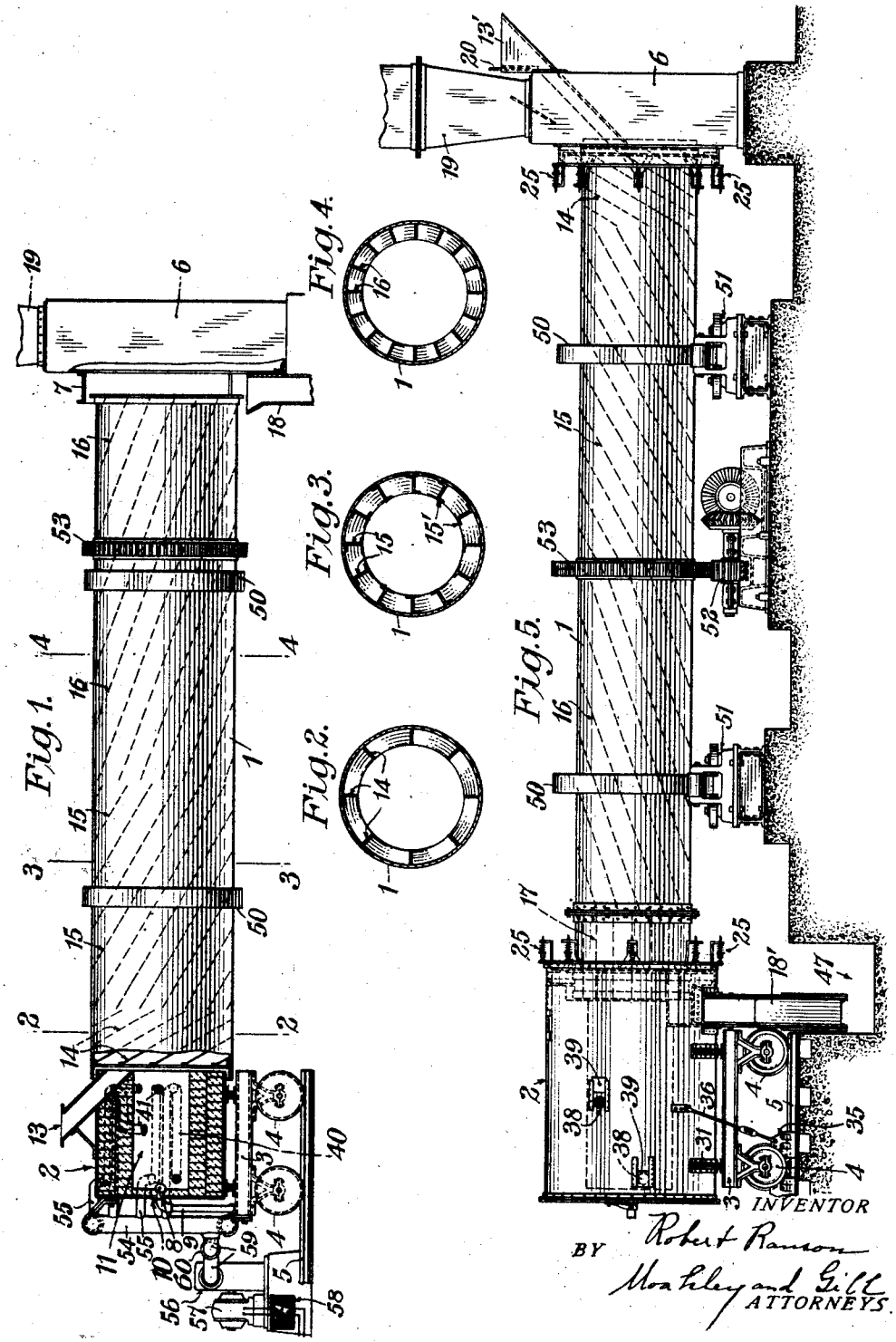

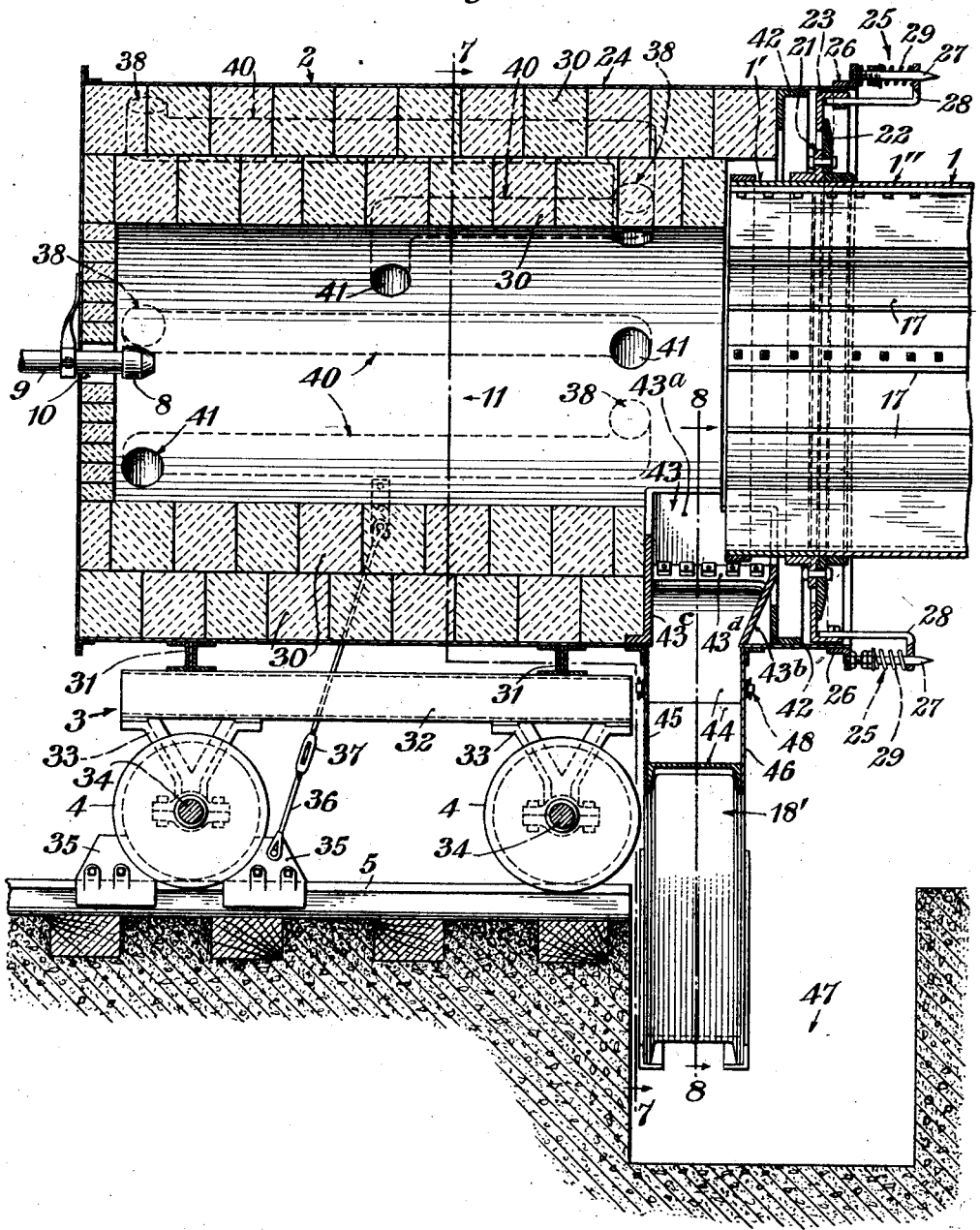

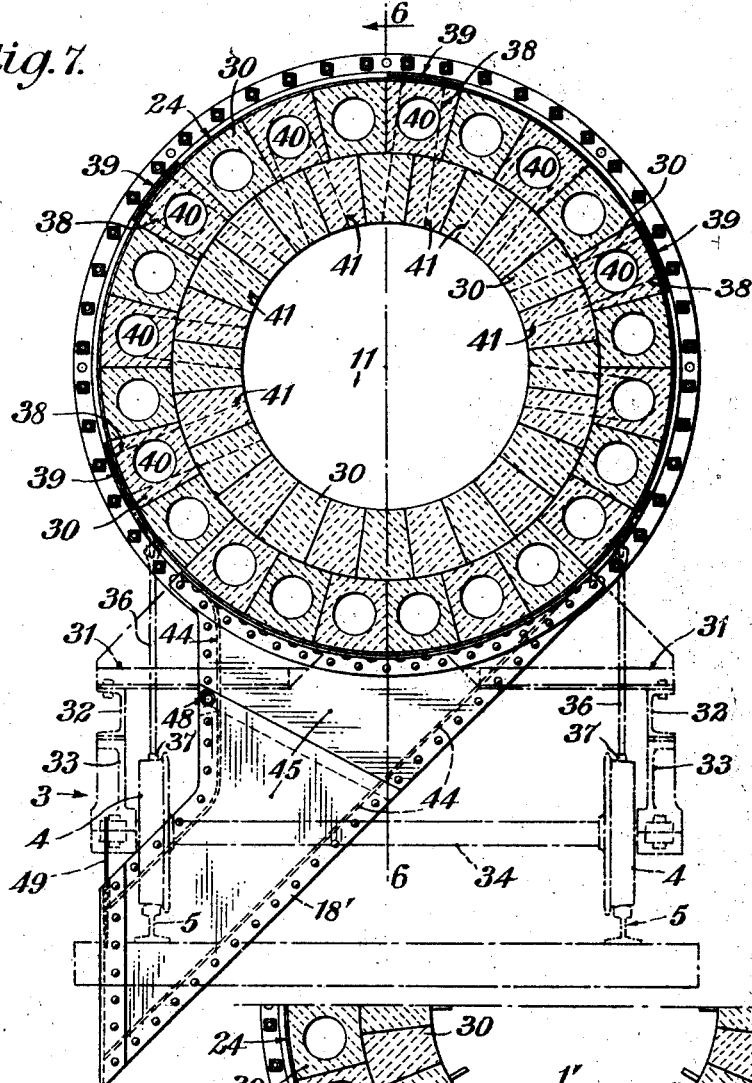
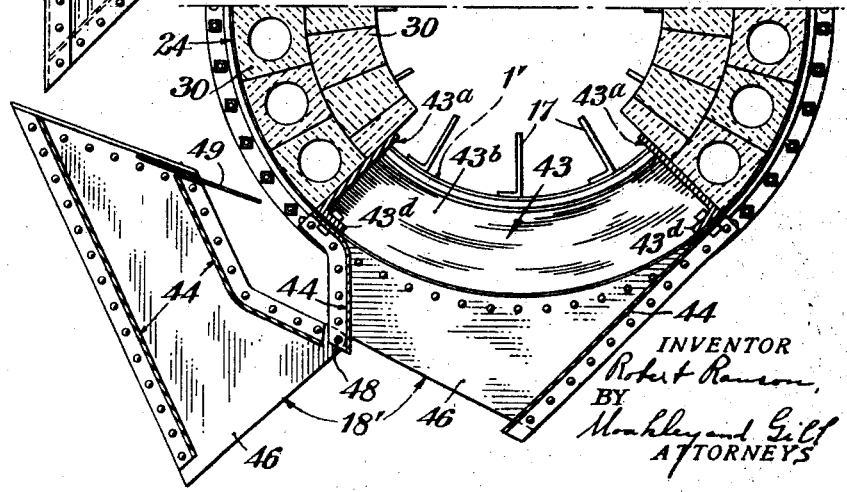

1,703,635

UNITED STATES PATENT OFFICE.

ROBERT RANSON, OF ST. AUGUSTINE, FLORIDA, ASSIGNOR OF ONE-HALF TO FORD INSTRUMENT COMPANY, INC., OF NEW YORK, N. Y., A CORPORATION OF NEW YORK.

DRIER.

Application filed August 31, 1921. Serial No. 497,221.

This invention relates to driers of the type in which the material to be dried is supplied to a relatively long drum through which pass hot gases from a furnace at one end of the drum.

In all driers of this type as heretofore constructed, so far as I am aware, the furnaces have been built as a permanent part of the apparatus and have required that large numbers of units of refractory material be used for linings and other parts exposed to the action of the products of combustion, and the metallic parts of the furnaces have been correspondingly massive in order to support the heat resisting units. The initial installation of such a furnace is a matter of considerable expense and time. In case of a breakdown of any of the units or other parts of a furnace, the drier has to be shut down while repairs are being made, and this may require a considerable period of time, particularly in case a large number of adjoining units have to be replaced. To avoid the loss of production due to shutting down a drier for renewals of its furnace lining and other repairs, duplicate driers are usually provided, thus still further increasing the cost of installation and upkeep of a plant.

In single tube, direct heat driers it is customary to provide a hole in the furnace wall, which is almost if not quite as large in diameter as is the shell of the drier. In such a construction the hot gases impinge on the shell, especially at the end adjacent to the furnace, with the result that this end of the shell is overheated and rapidly burns out and needs renewal from time to time.

It is an object of this invention to provide a drier consisting of a member, such as a drum, and a self contained, portable furnace, which, when needing repairs or relining with refractory material may be withdrawn in its entirety to permit the substitution of an alternative furnace, thereby avoiding a material cessation of operation of the drier. Extra driers to take care of periods of shut down are, therefore, not required, it being only necessary to provide a reserve furnace for the drier at comparatively slight expense as compared with the cost of the entire drier.

A further object of the invention is the provision of a furnace of simple and inexpensive construction in which a comparatively small number of refractory units are required, which may all be of one type thereby avoiding the necessity for using several types and sizes of fire brick. The combustion chamber of the furnace is of lesser cross sectional area than is the shell of the drier, preferably about one-half the diameter, so that the flame passes into the shell in a central column and does not impinge on it. The danger of burning out the end of the shell adjacent to the furnace is avoided, the loss of heat by radiation is lessened and a more uniform temperature exists throughout the drier shell. The life of the whole apparatus is therefore increased.

As an example of the advantages of the invention may be mentioned the fact that the furnaces of some of the usual types of driers contain something like one hundred times as many bricks as are required for a furnace and foundation of similar capacity constructed in accordance with the invention, and when they require rebuilding, usually are not capable of restoration for a period of a week or more on account of the time required for them to cool in addition to that required for repairs. On the other hand, the substitution of the portable furnaces of the invention requires a length of time ordinarily measurable in minutes.

Another object of the invention is the provision of a furnace of the character stated above, adapted for use with gas, or liquid fuel when atomized by steam, and containing in its lining suitable ducts for the introduction of an additional atmospheric air supply at appropriate points to promote combustion of the water gas, which is the result of the fine spray of oil and steam on the hot brick lining and is composed of hydrogen of water and a certain amount of unburnt oil, thus furnishing heat in excess of the actual B. t. u. content of the oil which would ordinarily escape unconsumed This invention also permits of the recognition of the susceptibility of some substances, such as peat, to the direct action of fire, and provision is made in such cases for feeding the material under treatment away from the furnace. In other instances, where the material is immune to the higher temperatures at the furnace, as in the case of phosphate, an arrangement is provided whereby the material is advanced toward a place of discharge at the furnace. In either case however, the heat and blast travel from the fire to a dust chamber at the other end of the drier.

Other objects and advantages appearing hereinafter are, of course, to be understood as coming within the scope of the present invention, and it is not my intention to limit the form of embodiment of the invention, except in accordance with the appended claims.

In the drawings,

Fig. 1 is a side elevation of the main portions of a rotary drier adapted to feed material away from the furnace, the latter being shown in section;

Figs. 2, 3, and 4 are transverse sections through the rotary drying chamber, illustrating the arrangement of the flights therein, and being taken on lines 2—2, 3—3 and 4—4, respectively, of Fig. 1;

Fig. 5 is a more complete side elevation of a form of rotary drier in which the material is fed toward the furnace;

Fig. 6 is a vertical longitudinal section through the furnace and part of the drying chamber of Fig. 5, being taken on line 6—6 of Fig. 7 in the direction of the arrow;

Fig. 7 is a transverse section through the furnace of Fig. 5 on line 7—7 of Fig. 6; and Fig. 8 is a similar view through about one half of the furnace, being taken on line 8—8 of Fig. 6.

Referring now to the drawings, and particularly to Fig. 1, 1 represents the cylindrical metallic shell that constitutes the housing of the rotary drying chamber. One end of shell 1 loosely telescopes the adjacent end of a portable furnace 2, which is mounted on a truck 3, the wheels 4 of which rest on track 5. Extending away from furnace 2 for a suitable distance, the shell 1 has its opposite end entered into the mouth of a dust chamber 6 of suitable size and construction to suit the materials to be dried. The mouth of the dust chamber may conveniently be a channel-shaped annulus 7, outlining the entrance to the dust chamber.

Both ends of shell 1 are, therefore, telescoped with their associated parts, eliminating the necessity for gas tight rings, and the small amount of additional air entering between the telescoped parts is beneficial rather than otherwise.

A suitable burner 8, receiving liquid or gaseous fuel through a supply pipe 9 is projected into the furnace interior 11, as shown in Fig. 1, air for producing a combustible mixture entering through a hole 10 that admits the burner. Additional air which may be furnished by a suitably controlled fan for further improving the combustion is admitted into the combustion chamber 11 through auxiliary ventilating passages 40, later more fully referred to.

Mounted upon and projecting through furnace 2 is an inlet chute 13 for the entrance of material to be dried, such as peat, into the drying chamber formed principally by shell 1. Positioned to receive the material emerging from chute 13 are flights 14 disposed, in the structure of Fig. 1, at an angle of 60° to the axis of the cylindrical shell 1. This inclination approximates that of chute 13 and permits of a rapid clearing of the latter of material which is thus deposited with facility and dispatch in the drying chamber 1. Other groups of flights, namely, 15 and 16, each successively decreased in angularity to the axis of the drying chamber, and staggered at ends, gradually advance the material to a place of egress from the drying chamber, whence it is expelled into a discharge chute 18 adjacent to the dust chamber 6.

Flights 14, 15 and 16 are helically arranged within shell 1, as indicated in Figs. 2 to 4 inclusive, the dotted lines of Figs. 1 and 5 merely representing the angularity of the flights due to their change of pitch in successive groups. Figs. 2 to 4 inclusive also disclose that circumferentially each successive group of flights possesses a greater number of flights than the preceding group. From this it is obvious that, received in its crudest form by flights 14, the material to be treated is tumbled about in relatively wide channels formed by the flights of this group, and falls again to the bottom of the drying chamber after having been elevated to, or nearly to, the top thereof. The movement of the material is aided by the air currents from a blast fan, and the drier shell may be set horizontal instead of being mounted on an inclined foundation as is frequently done.

Reduced to pieces of smaller proportions, the material is propelled by flights 14 into the narrower channels formed by flights 15. The latter flights are furnished with flanges 15′, causing the material while in this flight group to be retained in tumbling condition for a longer period in the flight-formed channels, and to be shed in still smaller pieces.

Ejected by flights 15 into still narrower channels between flights 16, the material receives a final tumbling and downward sifting and is ultimately discharged in relatively fine form into chute 18, to be carried to a point of temporary accumulation.

Throughout its travel through the drying chamber 1, the material is rolled over and over, thereby being intimately subjected to the hot gases that flow from the combustion chamber 11 of furnace 2, through the drying chamber 1 and into dust chamber 6, where they escape through the chimney 19 leading therefrom. When the material is shed from the upper part of the drying chamber from the helically arranged flight, it falls to the bottom thereof in curtain-like fashion over the whole diameter of the drier, and is thoroughly permeated by the more or less intense gaseous products of combustion.

When the material to be treated is not of an inflammable nature, it may, if desired, be sent through a rotary drier of the type illustrated in Figs. 5 to 8 inclusive. In this form, the drier has its inlet chute 13' for the material contiguous to the dust chamber 6, such chute being provided with a gate 20 for governing the passage and stoppage of the material.

The drying chamber shell 1 illustrated in Fig. 5 enters both the furnace 2 and the mouth of the dust chamber 6 to a greater extent than does the corresponding shell shown in Fig. 1. Accommodation may therefore be made for gas-tight rings at each end of the drying chamber 1, if desired, to effect a dependable closure between the ends of the revoluble drying chamber shell and the co-operative parts of the non-rotary furnace 2 and dust chamber 6.

One arrangement that may be employed for this purpose is shown in Fig. 6, it being understood that a similar arrangement will be provided at the other end of the drying chamber. In this figure, shell 1 will be noted to have an end section 1' and a next adjacent section 1'', contiguous ends of which are coupled by means of angle-shaped annuli, 21 and 22, respectively secured to shell sections 1' and 1'' and being in turn bolted together.

The outwardly extending flange of ring 22 is wider than that of ring 21, and its flat inner face lies against the outer flat face of another angle-shaped ring 23. The last mentioned ring is of slightly less external diameter than the internal diameter of the encompassing sheathing 24 of furnace 2. Ring 23 is not revoluble, but is movable for a short distance parallel to the axis of the furnace, being mounted upon suitable supports 25 arranged circumferentially about the edge of the furnace sheathing at the end thereof which telescopes with the drying chamber shell 1.

This edge of sheathing 24 is bound by an encircling angle 26, into which at suitable intervals are threaded and locked by nuts guide rods 27 of the ring-supporting devices 25. Arranged to slide along guide rods 27 are L-shaped brackets 28 extending into supporting relation with ring 23 to which they are secured. Appropriate springs 29 are coiled about rods 27, bearing at one end against washers backed by suitable adjusting nuts, the opposite ends of springs 29 pushing against slidable brackets 28, thereby maintaining the furnace gas-ring 23 in yielding and constant contact with the drying chamber ring 22. The closures thus effected between the furnace and the drying chamber are automatically adjustable to any minor disturbances incident to operation.

Furnace 2 is a compact complement of the drying chamber or drum 1, and is so constructed as to confine the refractory lining to itself, and permit the external diameters of both the drying chamber 1 and the furnace 2 to nearly approximate each other so that a minimum of refractory lining is required.

A consequent reduction in the number of fire brick 30 not only results in a much cheaper furnace, but one that requires less time to repair. This time saving is additional to that due to the ready furnace removability and substitution provided for by my invention. The internal diameter of the furnace is somewhat less than that of the drying chamber so that the hot gases do not impinge on the wall of the latter as they leave the furnace.

Normally, the furnace is in the relation to the drying chamber that is illustrated in Fig. 6. As shown, the body of the furnace 2 is supported on transverse members 31, resting upon side sills 32 of truck 3, depending from which are bearing brackets 33, there being axles 34 in these brackets on which axles are mounted flanged wheels 4 arranged to run on track 5. In Fig. 7 these parts are shown in dot and dash lines to avoid obscuring the details of a discharge chute later referred to.

To confine the furnace 2 in its co-operative relation to drying chamber 1, locking blocks 35 are suitably clamped to the rails of track 5, such blocks embracing certain of the wheels 4 of track 3, thereby anchoring furnace 2 from longitudinal displacement with respect to the drying chamber 1.

Guarding the furnace from lateral displacement are stays 36 attached at their upper ends to opposite sides of the body of furnace 2 and at their lower ends to anchoring blocks 35. Turn-buckles 37 connect sections of each stay 36, permitting any desired or necessary adjustment of the tautness thereof.

A burner 8 of any suitable or approved type is located in the combustion chamber of furnace 2, being supplied with liquid or gaseous fuel through supply pipe 9. This pipe enters through aperture 10, through which air for the burner also enters. To insure a highly perfected combustion in furnace 2, an auxiliary air supply is provided, in which a plurality of appropriately arranged air ducts extend from the exterior of the furnace to the interior thereof, and, under conditions rendering it advisable, air may be fed to the air ducts through pipes leading from a suitably controlled fan or air blower.

In Fig. 5, some of the inlet ports 38 appear, one being shown as fully opened and another as entirely closed by the shutters 39, with which the ports are provided. Referring now to Figs. 6 and 7, it will be apparent that air entering ports 38 passes by way of ducts 40 to discharge orifices 41 opening into the internal combustion chamber of furnace 2. It will be observed that ducts 40 lie parallel to the axis of the cylindrical body of furnace 2, and that the discharge orifices are well distributed over the internal concave surface of the refractory lining 30. Ducts 40 are relatively lengthy, whereby the air is thermally prepared for entrance into the combustion chamber.

Thus, as shown in Fig. 6, air may enter an inlet 38 near the outer end of the furnace, and, passing through duct 40 associated therewith, be discharged into the combustion chamber near the opposite end of the furnace adjacent to the drying chamber 1. The next circumferentially spaced duct 40 may have its inlet port 38 located adjacent to the drying chamber 1, this duct leading from such port in a direction reverse to that of the first mentioned duct and so continuing to its discharge orifice 41, which is positioned near the outer end of the furnace. In order that the air shall enter the combustion chamber at well distributed points, still other ducts 40 have inlet ports 38 at one or the other of the ends of furnace 2, such last referred to ducts leading to orifices 41 that discharge into the combustion chamber at locations intermediate the discharge orifices that open into this chamber near its opposite ends. It is thus seen that the air is introduced into the combustion chamber at separated points so that the combustion shall be entirely satisfactory throughout the length of such chamber.

When material is of such character that its heat treatment is best accomplished by feeding it away from the furnace 2, it is advisable to place the inlets of air ducts 40 into communication with a source of forced air, as shown in Fig. 1. In this view, an annulus tube or pipe ring 54 is mounted by brackets, or otherwise, on the outer end of furnace 2, and is provided with branch pipes 55 that lead to the inlets of ducts 40 of the furnace.

Pipe ring 54 receives a supply of forced air from a fan or blower 56 driven by a motor 57 under regulatory speed control of any appropriate means, as a rheostat 58. From blower 56, a separable supply of pipe 59 leads to the pipe ring 54, and is coupled intermediate its length by a union 60, whereby the furnace 2 may be disconnected from the blower 56, when it is desired to remove the former from drying chamber 1 of the drier. Thus, the combustion in chamber 2 of the furnace may be controlled in accordance with the requirements of the furnace.

Adjacent to the drying chamber 1, the outer layer of fire brick 30 abuts a retaining ring 42, except that at the bottom of the furnace the bricks are sufficiently retracted to accommodate a hopper casting 43. This casting has downwardly flaring side walls 43$^a$, best shown in Fig. 8, and an inclined shedding back wall 43$^b$, which is disclosed in Fig. 6 to extend under the adjoining end of drying chamber 1. The front wall 43$^c$ lies against and is interlocked with the contiguous refractory brick 30.

Side walls 43$^a$ of the hopper are furnished in their lower portions with flanges 43$^d$, bolted to which is the upper end of a fabricated discharge chute 18', which is carried by the furnace. As illustrated, this chute may comprise sides formed of commercial channels 44 connected by front and back walls 45 and 46, respectively, of sheet metal.

Chute 18' is articulated, permitting its lower portion to be swung up, as shown in Fig. 8 out of the material receiving pit 47 of Figs. 5 and 6, whenever it is desired to retract the furnace from the drying chamber 1. For this purpose, the lower part of chute 18' is hinged to the upper at 48 and is adapted to swing by gravity to closed position. A suitable gate 49 is present at the lower end of chute 18' for regulating, when desired, the degree of discharge of the material treated by the drier.

As in the first described form, the drier is provided with flights 14, 15 and 16 and an additional group 17, all functioning as already described.

In both illustrated forms, the shell of the drying chamber 1 is surrounded by bearing annuli 50 adapted to be held in bearing cradles 51, as shown in Fig. 5, for rotation with the drying chamber 1. Such rotation may be accomplished through the driving gear 52 in mesh with a gear ring 53 affixed to drying chamber 1.

To operate the drier, the furnace 2 will have been moved along track 5 into co-operative relation with the drying chamber drum 1. In the form shown in Figs. 1 to 4 inclusive, no gas tight rings are employed, the inner end of furnace 2 being slightly telescoped with drying chamber drum 1. The arrangement illustrated in Figs. 5 to 8 inclusive, however, shows furnace 2 provided with a resiliently mounted ring 23 co-operating with another ring 22 rigidly combined with drying chamber drum 1, so establishing a closure against the escape of gases.

After being brought into position, furnace 2 is preferably locked therein by the locking blocks 35 gripping track 5 and engaging wheels 4 of truck 3, upon which the furnace 2 is mounted.

In the drier of Figs. 1 to 4 inclusive, the material to be treated, such as peat, for example, is fed into chute 13. Thence it passes onto flights 14 and from these to flights 15 and 16, in the order named, each succeeding set of flights being of lesser inclination or helical pitch. The material under treatment is carried from the lower to the upper portion of the drying chamber 1 by the flights, being tumbled and dropped again to the lower part of the chamber. The constantly breaking pieces or particles of the material are continuously subjected to heat permeation by the flow of hot gases from furnace 2, through drying chamber 1 to dust chamber 6 and chimney 19. Expelled by the last set of flights 16, the now treated material is discharged into chute 18 for removal to a convenient place of accumulation.

In the form shown in Figs. 5 to 8 inclusive, noninflammable material, such as phosphate rock is initially fed into chute 13' that is combined with dust chamber 6, and is fed forward by flights 14, 15, 16 and 17 toward the furnace 2, being there ejected into the articulated chute 18' carried by the furnace, so arriving in accumulating pit 47.

Occasion arising to repair or reline the furnace 2, locking blocks 35 are disconnected from track 5, and, in either form, the furnace is run away from the drying chamber drum 1 to a place of repair. Immediately, however, another furnace of like construction is run up and into co-operative relation with the drying chamber 1, and the operation of the drier continues with but negligible delay. In the case of the form of Figs. 5 to 8, the chute 18' is jointed so that its lower end may be raised out of pit 47 when it is desired to withdraw furnace 2 from the drying chamber.

From the foregoing, it is apparent that I have invented a comparatively simple but rugged drier, which may be arranged to feed material to be treated in accordance with its character, and in which the loss of heat by radiation is reduced and the danger of burning the fire end of its shell is eliminated by the contraction of the diameter of the flame to a fraction of that of the shell. The invention makes possible the practical avoidance of the cessation of operation that causes losses of very considerable proportions in driers as heretofore constructed.

While certain preferred embodiments of the invention have been shown and described it will be understood that various changes may be made in the details of construction without departing from the principle of the invention as defined in the appended claims.

I claim:

1. In a drier, a rotary drum, a portable furnace, said drum and furnace having similarly shaped co-acting ends, said drum containing a drying chamber and said furnace having an internal bore of less cross-sectional area than that of said chamber, and means for removing the products of combustion.

2. In a drier, a drum containing a drying chamber, and a portable furnace comprising a combustion chamber having such internal bore as will laterally restrict the hotter elements of combustion entering the drying chamber, and means supporting the combustion chamber adapted to transfer said furnace to and from said drum.

3. In a drier, a member forming a drying chamber, and a portable furnace comprising a refractory lining having a distributed ventilation therethrough and forming a combustion chamber adapted for co-operation with said drying chamber and fuel burning means in said combustion chamber.

4. In a drier, a member forming a drying chamber, and a portable furnace comprising a ventilated refractory lining forming a combustion chamber movable into and out of correlation with said drying chamber and means for regulating the ventilation through said refractory lining.

5. In a drier, a drum forming a drying chamber, a traveling furnace comprising a refractory lining forming a combustion chamber and provided with air ducts therethrough from the exterior to the last mentioned chamber and air-regulating means for said ducts.

6. In a drier, a member having a drying chamber, a portable furnace having a combustion chamber for combination with said drying chamber, means for producing combustion in the combustion chamber, auxiliary air supply progressively entering the latter chamber and means for controlling said auxiliary air supply.

7. In a drier, a drum having a drying chamber, and a portable furnace comprising a refractory lining forming a combustion chamber co-operative with said drying chamber, said refractory lining having air passages leading from the exterior near one end of said combustion chamber to places of entry into the last mentioned chamber near the opposite end thereof.

8. In a drier, a drum having a drying chamber, and a portable furnace having a combustion chamber for combination with said drying chamber, there being air passages in said furnace some having inlets from the exterior thereof at one end of the furnace and others having inlets at the opposite end thereof, said passages leading to places of entrance into said combustion chamber at the end of the furnace opposite to that which they entered.

9. In a drier, a drum having a drying chamber, and a portable furnace having a combustion chamber for combination with said drying chamber, there being air passages in said furnace some having inlets from the exterior thereof at one end of the furnace and others having inlets at the opposite end thereof, some of said passages leading to places of entrance into said combustion chamber at the end of the furnace opposite to which they entered and others entering this chamber intermediate its ends.

10. In a drier, a furnace, a revoluble drum forming a drying chamber, and successively arranged sets of flights mounted in said chamber, succeeding sets thereof varying in numbers of flights and in the pitch of the latter.

11. In a drier, a furnace, a material chute, a revoluble drum forming a drying chamber, and successively arranged sets of flights mounted in said chamber, succeeding sets thereof varying in numbers of flights and degree of inclination longitudinally of said drum, said chute co-acting with the set of flights having the steepest inclination.

12. In a drier, a rotary drying chamber drum, a track, a portable furnace comprising a truck operable on said track and a combustion chamber mounted on said truck, and means for locking said truck to said track, extending to and laterally staying said furnace with said combustion chamber in co-operative relation with said drum.

13. In a drier, a member forming a drying chamber, and a portable furnace comprising a refractory lining forming a combustion chamber and provided with air ducts from the furnace exterior to the last mentioned chamber, fuel burning means in the latter, and means to effect the joining and separation of both chambers.

14. In a drier, a drum forming a drying chamber, a traveling furnace comprising a refractory lining forming a combustion chamber and provided with air ducts therethrough from the exterior to the last mentioned chamber, air-regulating means for said ducts and a running gear carrying the combustion chamber adapted to place said drum and furnace into and out of correlation.

15. In a drier, a drum having a drying chamber, a pocket for the receipt of dried material, a traveling furnace having a combustion chamber movable into co-operative correlation with said drying chamber, and an articulated chute carried by said furnace and mounted to be moved into position to receive material from said drying chamber, said chute being operable to be moved into and out of said pocket.

16. In a drier, a revolubly mounted drum having a drying chamber, a member containing a hollow interior open to said drying chamber, overlapping rings carried by said drum and said member effecting a closure therebetween, and resilient supporting means for one of said rings maintaining both rings in yielding intimacy.

In testimony whereof I affix my signature.

ROBERT RANSON.